United States Patent Office 3,644,543
Patented Feb. 22, 1972

3,644,543
PROCESS FOR PREPARING HALOGENATED
AROMATICS
Vincent A. Notaro, Monroeville, and Charles M. Selwitz, Pitcairn, Pa., assignors to Gulf Research & Development Company, Pittsburgh, Pa.
No Drawing. Filed July 3, 1969, Ser. No. 839,094
Int. Cl. C07c 25/00, 25/04
U.S. Cl. 260—650 R                                    10 Claims

ABSTRACT OF THE DISCLOSURE

A process for preparing a nuclear chloro or nuclear bromo aromatic compound which involves heating an aromatic compound in the presence of a nitrate ion, a nitrite ion, NO or $NO_2$, a chloride or bromide ion, water, oxygen and a fatty carboxylic acid.

---

A halogenated aromatic selected from the group consisting of chloro aromatics and bromo aromatics can be obtained by a process which comprises heating an aromatic compound selected from the group consisting of an aromatic hydrocarbon and a halogenated aromatic hydrocarbon with a compound selected from the group consisting of copper, manganese, cerium, cobalt, vanadium, chromium, iron, nickel, cadmium, tin, antimony, mercury, bismuth and the noble metals and compounds of these metals, a substance selected from the group consisting of nitrate ions, nitrite ions, NO and $NO_2$, a halogen ion selected from the group consisting of chloride ions and bromide ions and an inert organic solvent.

In the above procedure the defined metal or metal compound and organic solvent can be eliminated, provided water and molecular oxygen are present, and the desired chloro aromatic or bromo aromatic will still be obtained. In other words the process involves heating an aromatic compound selected from the group consisting of an aromatic hydrocarbon and a halogenated aromatic hydrocarbon with a substance selected from the group consisting of nitrate ions, nitrite ions, NO and $NO_2$, a halogen ion selected from the group consisting of chloride ions and bromide ions, water and molecular oxygen. In this manner a simple and economic system is obtained, since the presence of the organic solvent and the metal or metal compound tends to give rise to difficult and serious recovery and purification problems. This is disclosed in our copending application Ser. No. 730,646 filed May 20, 1968.

We have found, unexpectedly, that in the above procedure the presence of a fatty carboxylic acid increases the rate of conversion of the aromatic hydrocarbon and the halogenated aromatic hydrocarbon and, in the case wherein said aromatic hydrocarbons carry at least one alkyl substituent having at least one hydrogen on the carbon atom adjacent to the aromatic ring, there is reduced reaction of said alkyl with halogen, oxygen, etc. By "fatty carboxylic acid" we mean to include those compounds containing a carboxylic acid group

attached to hydrogen or to an alkyl group $C_nH_{2n+1}$, where $n$ is an integer from one to 10. Examples of such acids which can successfully be employed herein are the alkanoic acids such as formic acid, acetic acid, pivalic acid, butyric acid, isobutyric acid, valeric acid, isovaleric acid, octanoic acid, 2-ethylhexanoic acid, pelargonic acid, decanoic acid, etc.

The aromatic hydrocarbon reactant employed herein can be an aromatic hydrocarbon or a halogenated (chloro, bromo, fluoro, or iodo) aromatic hydrocarbon. Examples of such aromatic hydrocarbons that can be employed herein include benzene, toluene, ethylbenzene, cumene, naphthalene, anthracene, biphenyl, phenanthrene, t-butylbenzene, α-phenylnaphthalene, para-xylene, polystyrene, terphenyl, 3-phenylheptane, 1,4-diphenyl butane, diphenylmethane, tetralin, propylium anion, etc. Examples of such halogenated aromatic hydrocarbons that can be employed herein include chlorobenzene, ortho-bromotoluene, meta - iodobiphenyl, para-fluorobiphenyl, 2,3-dichloronaphthalene, ortho-chlorotoluene, meta-chlorotoluene, para-chlrotoluene, 1-phenyl-4-chlronaphthalene, 1-(3-fluorophenyl) - 4 - ethylnaphthalene, 2-iodophenanthrene, 6-chloronaphthacene, 4,10-dichlorochrysene, 1,5, 6,10-tetrabromopyrene, 1-fluoro-4-chloro-5-bromo-7-iodotriphenylene, tri(2-chlorophenyl)methane, fluorobenzene, bromobenzene, iodobenzene, ortho-dichlorobenzene, meta-dichlorobenzene, para-dichlorobenzene, etc.

Also present in the reaction system is a substance selected from the group consisting of nitrate ions, nitrite ions, NO and $NO_2$. Thus, any compound falling within the above definition or which, for example, by ionization, oxidation or disproportionation, under the reaction conditions defined herein will result in the same can be employed. By "nitrate ions" we mean to include $NO_3^-$, a singly charged anion containing one nitrogen atom and three oxygen atoms. By "nitrate ions" we mean to include $NO_2^-$, a singly charged anion containing one nitrogen atom and two oxygen atoms. Examples of compounds that can be employed include nitric acid, sodium nitrate, cesium nitrate, sodium nitrite, potassium nitrite, nitric oxide, nitrous anhydride, nitrous acid, nitrogen dioxide, nitrogen tetroxide, nitric anhydride, nitrosyl chloride, nitrosyl bromide, nitroxyl chloride, etc.

Additionally there must be present in the reaction system chloride ions or bromide ions in sufficient quanitities to halogenate the aromatic compound defined above. By "chloride ions or bromide ions" we mean a singly negatively charged chlorine or bromine atom. Desirably the chloride ion or bromide ion is obtained from any compound which is capable of dissociating in the reaction system to chloride or bromide ions, such as hydrogen chloride, hydrogen bromide, ammonium chloride, ammonium bromide, organic chlorides and bromides such as aniline hydrochloride, methyl amine hydrochloride, benzyl trimethyl ammonium bromide and metallic chlorides and bromides such as sodium chloride, potassium bromide, rubidium chloride, magnesium broide, cupric chloride, barium chloride, calcium chloride, aluminum bromide, etc. Also present in the reaction system is water, molecular oxygen and a fatty carboxylic acid.

The reaction defined herein is simply effected by bringing the materials together into contact with each other under specified conditions. The amount of chloride or bromide ion present in the reaction system relative to the aromatic hydrocarbon reactant, on a molar basis, can be from about 10:1 to about 1:20, preferably from about 2:1 to about 1:2. The amount of nitrate ion, nitrite ion, NO or $NO_2$ employed, on a molar basis, relative to the aromatic compound, can be from about 1:1 to about $1:10^6$, preferably from about 1:3 to about $1:10^6$. On a molar basis, relative to the aromatic compound, water can be present in the range of about 1000:1 to about 0.1:1, preferably about 10:1 to about 2:1. The amount of molecular oxygen that can be employed relative to the aromatic compound reactant, on a molar basis, can be from about 1000:1 to about 1:10, preferably from about 10:1 to about 1:1. The amount of fatty carboxylic acid employed relative to the aromatic compound, on a molar basis, can be from about 5:1 to about 1:5, preferably from about 3:1 to about 1:3. The temperature employed during the process can range from about 15° to about 200° C., preferably from about 60° to about 150° C., the pressure from about 0.1 to about 10,000 pounds per square inch gauge, preferably from about ten to about 1000 pounds per square inch gauge, but most preferably from about 50 to about 150 pounds per square inch gauge, and the contact time from about 0.0001 to about 200, preferably from about one to about ten hours.

At the end of the reaction period, the desired chloro or bromo aromatic compound can be recovered from the reaction mixture in any suitable manner, for example, by distillation at a temperature of about 50° to about 200° C. and a pressure of about 0.001 to about ten pounds per square inch gauge. Depending upon the boiling points of the products in the reaction mixture, the individual components thereof, including the desired chloro or bromo aromatic, will come off individually overhead and can thus be easily recovered.

The process of the invention can further be illustrated by the following:

A serious of runs were made in which a mixture of reactants, as set forth below in Table I, was heated in an atmosphere of oxygen. Analysis by gas chromatography resulted in data reproduced below in Table I.

TABLE I

| Run No. | 1 | 2 | 3 |
|---|---|---|---|
| Reactants, millimols: | | | |
| HCl | 452 | 452 | 452 |
| $HNO_3$ | 50 | 50 | 50 |
| $H_2O$ | 4,453 | 4,386 | 4,386 |
| Toulene | 450 | 450 | 450 |
| $HOOCCH_3$ | 0 | 987 | 0 |
| $H_3PO_4$ | 0 | 0 | 403 |
| Time, hours | 6.0 | 6.0 | 5.75 |
| T, °C | 80 | 80 | 80 |
| P, pounds per square inch gauge | 170 | 170 | 170 |
| Millimols oxygen used* | 55.20 | 95.16 | 68.16 |
| Products, weight percent in product: | | | |
| Toluene | 76.58 | 54.17 | 70.02 |
| Chlorotoluene | 25.99 | 46.41 | 32.12 |
| Benzaldehyde plus benzyl chloride | 1.16 | 1.13 | 1.84 |
| Benzyl alcohol | 0.22 | 0 | 0.18 |
| Unknown I | 0 | 0.15 | 0.12 |
| Chlorobenzaldehyde | 0.11 | 0 | 0 |
| Nuclear dichlorotoluenes | 0.77 | 0.37 | 0.76 |
| Alpha, ortho dichlorotoluene | 0.02 | 0.11 | 0.24 |
| Alpha, para dichlorotoluene | 0.18 | 0 | 0 |
| Trichlorotoluenes | 0.03 | 0 | 0 |
| Conversion percent (to chlorotoluenes) | 20.3 | 37.3 | 25.6 |
| Side chain attack, percent | 5.4 | 2.7 | 6.6 |

*Determined by pressure drop in system.

The improvement obtained by operation in accordance with the procedures defined herein can be seen from an inspection of the data in Table I. Note that in Run No. 2, wherein no fatty carboxylic acid was present, the conversion to chlorotoluene was 20.3 percent and the side chain attack amounted to 5.4 percent. In Run No. 2 the presence of acetic acid in the reaction system increased the conversion to 37.3 percent and the side chain attack was reduced to 2.7 percent. Phosphoric acid in Run No. 3, on the other hand, gave but a slight improvement in conversion and aided side chain attack. By "side chain attack" we mean the molar amount of reaction occurring in the alkyl group divided by the sum of the molar amount of reaction occurring at the alkyl group plus the molar amount of reaction occurring at the aromatic nucleus times one hundred.

The process can further be illustrated by the following examples.

EXAMPLE I

A mixture of the following was heated for six hours at a temperature of 100° C. and a pressure of 170 pounds per square inch gauge of oxygen: 452 millimols of hydrogen chloride, 50 millimols of nitric acid, 4386 millimols of water and 450 millimols of chlorobenzene. 23.04 millimols of oxygen were consumed (as determined by pressure drop in system). The product was analyzed by gas-liquid chromatography and found to contain the following weight percentages: 88.96 chlorobenzene, 10.83 dichlorobenzenes and 0.21 trichlorobenzenes.

EXAMPLE II

A mixture of the following was heated for six hours at a temperature of 100° C. and a pressure of 170 pounds per square inch gauge of oxygen: 452 millimols of hydrogen chloride, 50 millimols of nitric acid, 4386 millimols of water, 450 millimols of chlorobenzene and 987 millimols of acetic acid. 48.24 millimols of oxygen were consumed (as determined by pressure drop in system). The product was analyzed by gas-liquid chromatography and found to contain the following weight percentages. 76.70 chlorobenzene, 23.08 dichlorobenzenes and 0.22 trichlorobenzene.

EXAMPLE III

A mixture of the following was heated for six hours at a temperature of 80° C. and a pressure of 170 pounds per square inch gauge of oxygen: 452 millimols of hydrogen chloride, 50 millimols of nitric acid, 4386 millimols of water, 450 millimols of toluene and 987 millimols of isobutyric acid. 48.48 millimols of oxygen were consumed (as determined by pressure drop in system). The product was analyzed by gas-liquid chromatography and found to contain the following weight percentages: 69.85 toluene, 31.43 chlorotoluenes, 0.14 of a mixture of benzaldehyde and benzyl chloride, 0.04 of an unknown compound, and 0.10 dichlorotoluenes.

Obviously, many modifications and variations of the invention, as hereinabove set forth, can be made without departing from the spirit and scope thereof, and therefore only such limitations should be imposed as are indicated in the appended claims.

We claim:

1. In a process for preparing a nuclear halogenated aromatic hydrocarbon selected from the group consisting of nuclear chloro aromatic and nucleatr bromo aromatic hydrocarbons which comprises heating an aromatic compound selected from the group consisting of an aromatic hydrocarbon and a halogenated aromatic hydrocarbon with (1) a substance selected from the group consisting of nitrate ions, nitrite ions, NO and $NO_2$, (2) a halogen ion selected from the group consisting of chloride ions and bromide ions, (3) water, and (4) molecular oxygen, wherein the temperature employed is from about 15° to about 200° C., the pressure from about 0.1 to about 10,000 pounds per square inch gauge and the contact time about 0.0001 to about 200 hours, with the amount of chloride or bromide ion present relative to the aromatic hydrocarbon reactant, on a molar basis, being from about 10:1 to about 1:20, the amount of nitrate ion, nitrite ion, NO or $NO_2$, on a molar basis, relative to the aromatic compound being from about 1:3 to about $1:10^6$, the amount of water, on a molar basis, relative to the aromatic compound being in the range of about 1000:1 to about 0.1:1, and the amount of molecular oxygen relative to the aromatic compound, on a molar basis, being about 1000:1 to about 1:10, the improvement which comprises additionally having present in the reaction mixture an alkanoic acid having from one to 11 carbon atoms, wherein the amount of said alkanoic acid employed, relative to the aromatic compound on a molar basis, is from about 5:1 to about 1:5.

2. The process of claim 1 wherein said aromatic compound is an aromatic hydrocarbon.

3. The process of claim 1 wherein said aromatic compound is toluene.

4. The process of claim 1 wherein said aromatic compound is chlorobenzene.

5. The process of claim 1 wherein said chloride ions are obtained from HCl.

6. The process of claim 1 wherein said nitrate ions are obtained from $HNO_3$.

7. The process of claim 1 wherein said alkanoic acid has from one to eleven carbon atoms.

8. The process of claim 1 wherein said alkanoic acid is acetic acid.

9. The process of claim 1 wherein said alkanoic acid is isobutyric acid.

10. The process of claim 1 wherein the amount of said alkanoic acid employed, relative to the aromatic compound on a molar basis, is from about 3:1 to about 1:3.

References Cited

UNITED STATES PATENTS

| 2,152,357 | 3/1939 | Moyer | 260—650 |
| 2,174,574 | 10/1931 | Fogler | 260—650 |
| 3,160,653 | 12/1964 | Benning et al. | 260—650 |
| 3,214,481 | 10/1965 | Heineman et al. | 260—650 |
| 3,214,482 | 10/1965 | Caropreso et al. | 260—650 X |
| 3,509,204 | 4/1970 | Selwitz | 260—6550 X |

HOWARD T. MARS, Primary Examiner

U.S. Cl. X.R.

260—649 R, 649 DP, 649 F, 650 F, 651 R